United States Patent [19]

Lindman et al.

[11] Patent Number: 4,882,752

[45] Date of Patent: Nov. 21, 1989

[54] COMPUTER SECURITY SYSTEM

[76] Inventors: Richard S. Lindman, 3708 17th Ave. South, Minneapolis, Minn. 55407; Richard P. Lindman, 7625 18th Ave. South, Richfield, Minn. 55423; Edward D. Myers, 4440 Denton Way, Inver Grove Heights, Minn. 55075

[21] Appl. No.: 878,291

[22] Filed: Jun. 25, 1986

[51] Int. Cl.⁴ .............................................. H04K 1/00
[52] U.S. Cl. ........................................ 380/25; 380/4; 380/49; 340/825.31; 340/825.34
[58] Field of Search ................................ 235/379–382; 178/22.08, 22.09; 380/23–25, 3, 4, 49; 360/15; 340/825.31, 825.34

[56] References Cited

U.S. PATENT DOCUMENTS

| | | | |
|---|---|---|---|
| 3,906,460 | 9/1975 | Halpern | 178/22.08 |
| 3,984,637 | 10/1976 | Caudill et al. | 179/2 DP |
| 4,087,856 | 5/1978 | Attanasio | 364/200 |
| 4,193,061 | 3/1980 | Zoltai | 380/25 |
| 4,218,738 | 8/1980 | Matyas et al. | 364/200 |
| 4,246,442 | 1/1981 | Hashimoto | 179/2 DP |
| 4,246,638 | 1/1981 | Thomas | 364/200 |
| 4,262,329 | 4/1981 | Bright et al. | 364/200 |
| 4,304,990 | 12/1981 | Atalla | 235/380 |
| 4,310,720 | 1/1982 | Check, Jr. | 178/22.08 |
| 4,317,957 | 3/1982 | Sendrow | 178/22.08 |
| 4,349,695 | 9/1982 | Morgan et al. | 178/22.08 |
| 4,430,728 | 2/1984 | Beitel et al. | 364/900 |
| 4,446,519 | 5/1984 | Thomas | 364/300 |
| 4,484,067 | 11/1984 | Obrecht | 235/380 |
| 4,500,750 | 2/1985 | Elander et al. | 380/24 X |
| 4,520,233 | 5/1985 | Smith | 178/22.08 |
| 4,531,023 | 7/1985 | Levine | 178/22.08 |
| 4,536,647 | 8/1985 | Atalla et al. | 178/22.08 |
| 4,593,384 | 6/1986 | Kleijne | 380/3 |
| 4,618,897 | 10/1986 | Johnson et al. | 360/15 |
| 4,638,356 | 1/1987 | Frezza | 380/7 |
| 4,675,815 | 6/1987 | Kuroki et al. | 235/380 X |
| 4,679,226 | 7/1987 | Muehleisen | 380/25 |
| 4,685,056 | 8/1987 | Barnsdale, Jr. et al. | 380/3 X |
| 4,763,357 | 8/1988 | Barr | 380/48 |

FOREIGN PATENT DOCUMENTS 0134138 6/1986 Japan .................................... 380/23
2020513 11/1979 United Kingdom .

OTHER PUBLICATIONS

Parker, Donn B., "Safeguards Selection Principles," pp. 1–17.
"High-Speed Data Encryption Using the F9414," Fairchild A. Schlumberger Company, pp. 10–33 to 10–34.
2815* 16K(2kx8) Electrically Erasable Prom, *INTEL*, pp. 2–23 to 2–35.

Primary Examiner—Stephen C. Buczinski
Assistant Examiner—Bernarr E. Gregory
Attorney, Agent, or Firm—Kinney & Lange

[57] ABSTRACT

A security system for distributed computer systems with a central computer and remotely located interactive terminals. The security system includes a master security control processor (SCP) which is associated with the central computer, and one or more slave SCPs, each of which is associated with one of the interactive terminals. Clearance at several security levels is required before communications between one of the remote terminals and the central computer is authorized. The security levels are implemented after communications are established to maintain only authorized access to the central computer. One of several unauthorized access modes are implemented when an unauthorized interactive terminal or SCP is identified. All data communicated between the master and slave SCPs is encrypted for security.

32 Claims, 8 Drawing Sheets

COMPUTER SECURITY SYSTEM

BACKGROUND OF THE INVENTION

1. Field of the Invention

The present invention relates to computer security systems. In particular, the present invention is a computer security system of the type having a master security control processor adapted to interface a central computer to a data transmission path, and at least one slave security control processor adapted to interface an interactive terminal to the data transmission path. The master and slave security control processors interact with each other to prevent unauthorized access to the central computer, and to secure data transmitted therebetween.

2. Description of the Prior Art

Distributed computer systems with remotely located interactive terminals are in widespread use. Governmental agencies, financial institutions and other businesses regularly use systems of this type for the communication of proprietary information. Since this information is typically transmitted over commercial telephone lines, standard radio links, and microwave channels in these systems, literally anyone may listen in on masses of sensitive information without being detected. Prior art security systems used to secure this information during transmission through the hostile environments have in general been elaborate, expensive and ineffective.

The Beitel et al U.S. Pat. No. 4,430,728 discloses a computer terminal security system which includes a dialer/transmitter circuit positioned between a remote terminal and a calling modem, and a receiver/checker which is positioned between a called modem and host computer. In order to access the host computer with a remote terminal, an operator must insert a memory key into the dialer/transmitter. The memory key contains a secret phone number which the dialer/transmitter dials in order to interconnect the remote terminal with the receiver/checker. Once the remote termminal is interconnected with the receiver/checker, a user identification code, also encoded on the key, is transmitted. Only after the user identification code is verified by the receiver/checker is the remote terminal connected to the host computer for data transmission.

The Check, Jr. U.S. Pat. No. 4,310,720 discloses a computer accessing system which includes a portable access unit which controls access to the main computer. The access unit generates a non-recurring access code which is a function of a user identification password entered into a terminal, and a random number generated by an encoder-decoder within the access unit. Only when the generated access code corresponds to an identical code generated by the main computer is a communications link established. Data transmitted between the terminal and computer are encrypted by the access unit in accordance with one of several different encryption techniques.

The Caudill et al U.S. Pat. No. 3,984,637 discloses a computer terminal security system in which a code transmitter and local code unit are positioned and interconnected between a remote terminal and terminal modems. An operator must first enter a first code which is compared to a code stored within the local code unit. Only when these codes match is the terminal interconnected with the modem. The code transmitter then transmits a code stored within the unit to the code receiver. If the code transmitted by the code transmitter corresponds to the code stored within the code receiver, the terminal is permitted to access the computer.

The Thomas U.S. Pat. No. 4,446,519 describes a method and apparatus for providing security for computer software. A software purchaser is provided with an electronic security device which is a circuit element plugged into a computer executing the software. The software and electronic security device exchange codes which must be properly recognized before the computer will execute the software.

The Morgan et al U.S. Pat. No. 4,349,695 discloses a system and method for identifying a remote terminal user and for identifying a message received from the terminal. An operator will indicate a desired recipient through one of a plurality of terminals. A CPU causes an autodialer to dial the recipient and establishes access to an outgoing line. An authenticator then authenticates whether or not the right recipient has been reached. This function is performed by enciphering a random character and transmitting it to the message recipient. Only if the message recipient properly deciphers the randomized character and transmits the randomized character back to the authenticator is communications continued. All data transmitted between the CPU and message recipient is also enciphered.

The Sendrow U.S. Pat. No. 4,317,957 discloses a system for authenticating users and devices in on-line transaction networks. At a remote terminal an operator will insert a card and enter a personal identification number. All information including request message, account number and other data are encoded by a multilevel encryption technique before being communicated to the main financial computer.

The Atalla U.S. Pat. No. 4,304,990 discloses a multilevel security apparatus and method for use with card-operated banking equipment. Information stored on the card and entered by the operator at the remote terminal including a personal identification number, bank identification number, and account number, are encrypted to produce a first code word or Offset I. All information used to produce this first level is therefore secured prior to any transmission. A second code word or Offset II is generated at a second security level using Offset I and a secret bank number. Similarly, a third level code or Offset III is generated by using Offset II and a card serial number.

The Bright et al U.S. Pat. No. 4,262,329 discloses a security system for data processing. Encrypted information is communicated between two computers. Encryption and decryption are performed by a computer within a hard-node which is maintained under a high degree of security. All confidential data base information is stored within the hard-node.

The Thomas U.S. Pat. No. 4,246,638 discloses a method and apparatus for controlling usage of a programmable computing machine. This is accomplished by encoding the operation codes of program instructions. The encoding is done as a function of the location of the instructions in memory and as a function of machine state. Circuits for encoding and decoding the operation codes in accordance with the method are described.

The Hashimoto U.S. Pat. No. 4,246,442 discloses a method and device for confirming correct information between data terminals using a telephone network. Once a communication line is established between the two terminals, an acknowledgement signal is transmitted from the called to the calling terminal. The identification code of the called terminal is then transmitted from the calling to the called terminal. The called terminal compares the received identification code with its own identification code. If an unfavorable comparison is made, the communication link is broken. If the comparison is favorable, the called terminal transmits its own code to the calling terminal. The calling terminal then compares the received code of the called terminal with the code of the called terminal previously stored at the calling terminal. Only if a favorable comparison is made is data transmitted between the terminals.

The Matyas et al U.S. Pat. No. 4,218,738 discloses a method for authenticating the identity of a potential computer user based on a comparison of information submitted by the potential user with information stored in the computer system. The potential use will enter an identification number and password at a terminal. The terminal then generates an authentication pattern which is a function of these two pieces of information. The authentication pattern is communicated to the main computer to verify the user identification.

The Attanasio U.S. Pat. No. 4,087,856 describes a computer operating system security mechanism. Both hardware and software are used to prevent a computer operator from branching outside predetermined bounds within the computer architecture.

The popularity of personal computers has greatly increased the computer security problem. Through personal computers, users are able to gain access to data bases, program libraries and other confidential information over commercial telephone lines. Although the National Bureau of Standards adopted a data encryption format using a 56-bit key to map one 64-bit word into another, personal computers can break this key, decode the confidential data and/or enter and encode their own data.

It is evident that there is a continuing need for improved computer security systems. An effective and economical computer security system which includes a master unit for interfacing a central computer to a data transmission path, and slave units for interfacing each of a plurality of interactive terminals to the transmission path, is preferred. The computer security system should be capable of implementing several security levels to prevent access to the central computer by unauthorized operators or slave units. Each slave unit should, therefore, be assigned a unique slave unit identification code and sync code. Security can be increased if the sync code must be properly received during a predetermined sync window.

A computer security system which is capable of destroying sensitive data used therein when unauthorized access attempts are detected would also increase security. Code words and encryption keys used by the security system should be stored in erasable memory. The computer security system could then erase the sensitive data in slave units which have been denied access to the system, and when physical tampering thereto is detected.

SUMMARY OF THE INVENTION

The present invention is a computer security system of the type having a master unit adapted to interface a central computer to a data transmission path, and at least one slave unit adapted to interface a peripheral unit to the data transmission path. In one embodiment, the system is characterized by first and second security levels. At the first security level, the slave unit transmits the slave unit identification code to the master unit. The master unit compares the received slave unit identification code to a data base of identification codes of authorized slave units, and grants a first security level clearance upon a favorable comparison. At the second security level, the master unit requests from the slave unit a slave unit sync code which must be received by the master unit during a predetermined sync window. The master unit compares the received sync code to a data base of sync codes of authorized slave units, and grants a second security level clearance upon a favorable comparison. Data transmission between the peripheral unit and the central computer is permitted by the security system only when the first and second security level clearances are granted.

In another embodiment, both the master and slave units of the system include cipher means for securing data transmission between the central computer and peripheral unit. The cipher means is characterized by means for storing a cipher key formed by a plurality of indexed cipher locations, each of which includes a mathematical function. Corresponding indexed cipher locations of the master unit and slave unit have complementary mathematical functions. The master and slave units also include means for mathematically operating on data by the mathematical function of selected corresponding indexed cipher locations so as to encipher data to be transmitted over the transmission path, and to decipher data received over the data transmission path.

In still other embodiments, all code words and cipher keys of the master and slave units are stored within erasable memory. When the master unit denies security level clearance, it generates and supplies an erase command to the slave unit thereby causing data in the erasable memory means to be erased. In still other embodiments, the master and slave units include tamper means for detecting physical tampering thereto. Once physical tampering is detected, code words and cipher keys stored in the erasable memory means are erased.

COMPUTER SECURITY SYSTEM DETAILED DESCRIPTION OF THE PREFERRED EMBODIMENTS

I. System Overview

Figure 1:
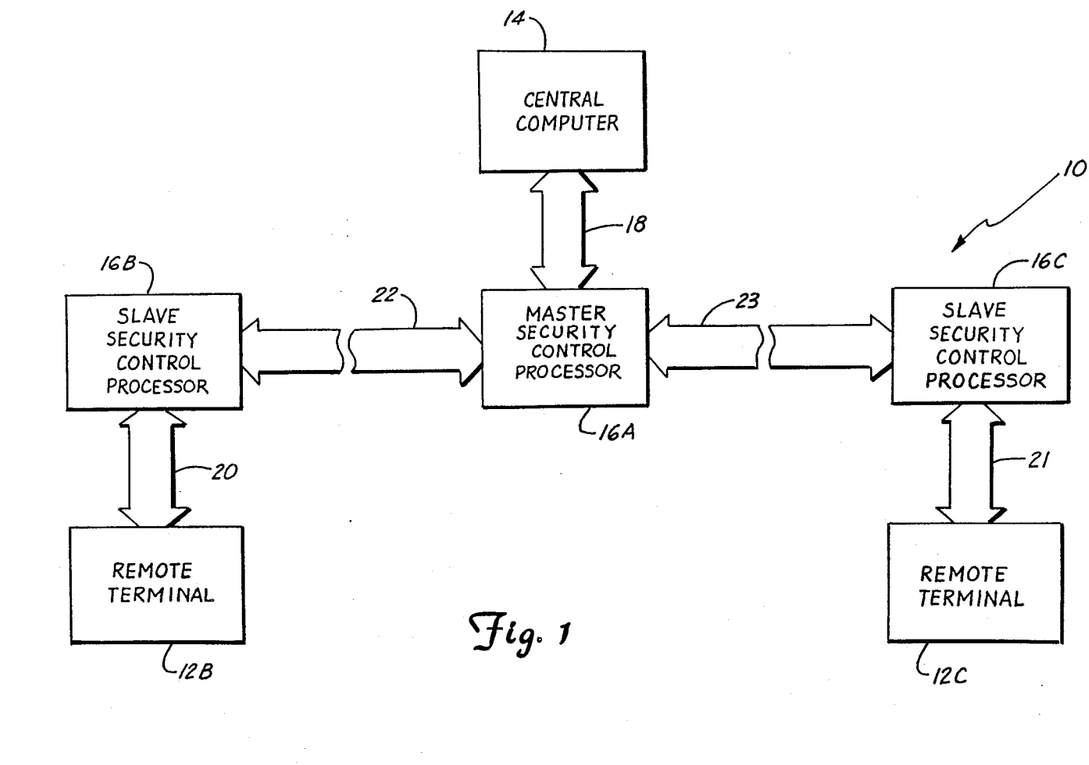
FIG. 1 is a block diagram representation of a computer security system in accordance with the present invention.

Computer security system 10 of the present invention is illustrated generally in FIG. 1. Computer security system 10 is adapted to interface a plurality of peripheral units such as remote interactive terminals 12B-12C to a central computer 14 and includes a plurality of security control processors 16A-16C. As shown, a master unit or master security control processor 16A (hereinafter referred to as master SCP 16A) is interfaced to central computer 14 for bidirectional data communication over transmission line 18. Slave unit or slave security control processor 16B (slave SCP 16B) is interfaced to its associated remote terminal 12B for bidirectional data communications over transmission line 20. Similarly, slave SCP 16C is interfaced to its associated remote terminal 12C by transmission line 21. Slave SCPs 16B and 16C are interfaced to master SCP 16A for bidirectional data communication over transmission lines 22 and 23, respectively.

Remote terminals 12B and 12C, which can for example be personal computers, and their associated slave SCP's 16B and 16C, are typically part of a distributed computer system and remotely located from central computer 14 and its associated master SCP 16A. Slave SCPs 16B and 16C, and master SCP 16A, secure data communications between central computer 14 and remote terminals 12B and 12C, and prevent unauthorized access to central computer 14. Details of computer security system 10 are described below.

II. Hardware Implementation

Although master SCP 16A performs some functions which differ from those performed by slave SCPs 16B and 16C, many of the functions performed by these two units are similar. As a result, master SCP 16A and slave SCPs 16B and 16C can be constructed of identical circuit elements. The functions associated with master SCP 16A and slave SCP's 16B and 16C can be easily implemented by software.

Figure 2:
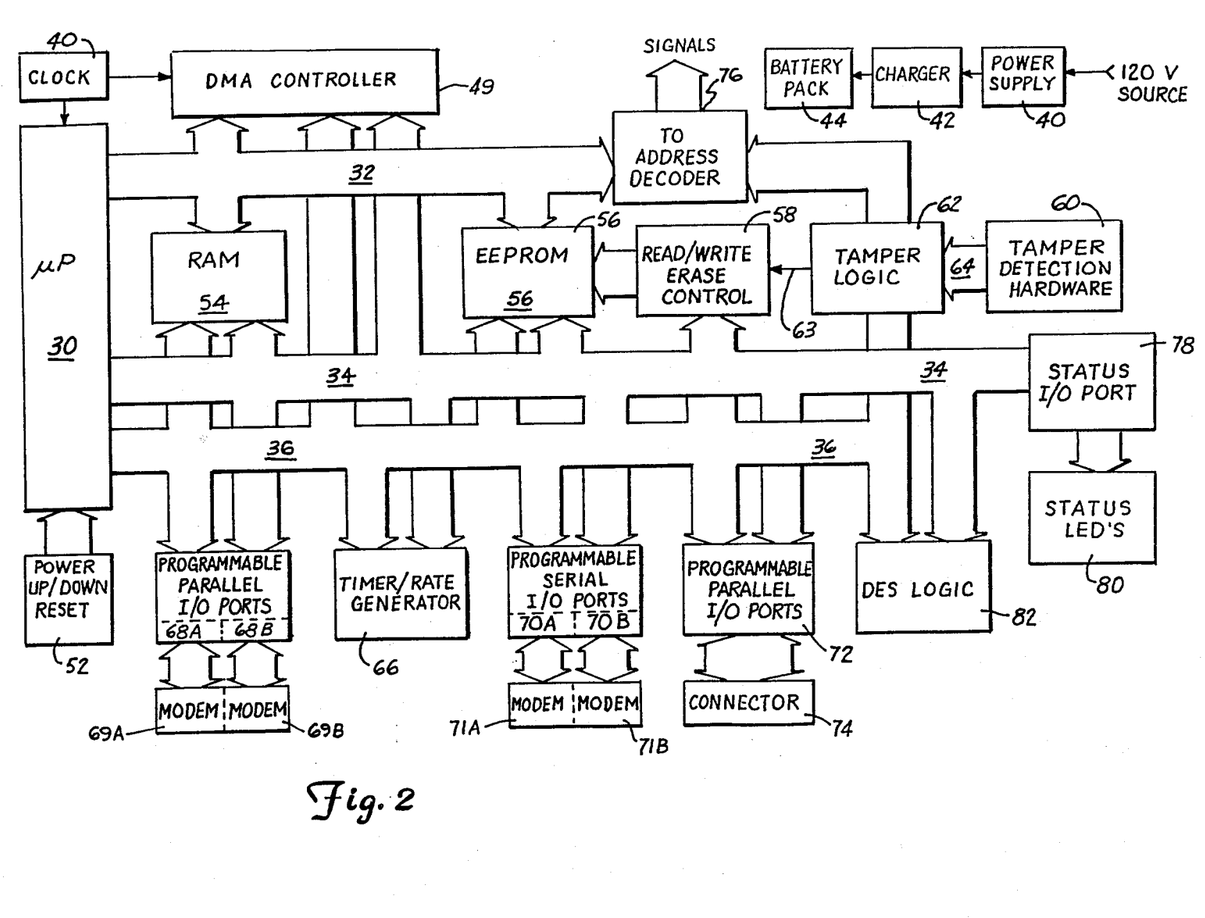
FIG. 2 is a block diagram representation of a slave security control processor illustrated in FIG. 1.

One preferred hardware implementation of slave SCP 16B, which is representative of slave SCPs 16A-16C, is illustrated in block diagram form in FIG. 2. Data processing and control operations of SCP 16B are coordinated by a controller such as microprocessor 30. Address data from microprocessor 30 is distributed throughout SCP 16B over address bus 32. Microprocessor 30 receives data from, and sends data to, various circuit elements of SCP 16B over bidirectional data bus 34. Control signals generated by microprocessor 30 are distributed throughout SCP 16 over control bus 36. In one preferred embodiment, SCP 16B is a Z-80A microprocessor manufactured by Zilog.

Electrical power for the circuit elements of SCP 16B is provided by a power supply system which includes power supply 40, charger 42, and batter pack 44. Power supply 40 is connected to receive electrical power from a source such as a 120 v AC outlet. Supply potentials provided by power supply 40 are distributed in a well-known manner to various circuit elements of SCP 16B.

Battery pack 44 preferably contains one or more rechargeable nickel cadmium batteries which provide power to circuit elements including microprocessor 30, tamper logic 62, read/write erase control 58, and EEPROM 56 in the event of a loss of power from the 120 v AC source. Batteries (not shown) within battery pack 44 are charged by charger 42 in a well known manner. In preferred embodiments, charger 42 will also cycle the batteries within battery pack 44 so that they can achieve their maximum life.

Associated with microprocessor 30 is clock circuitry 48 and power up/down reset circuitry 52. Clock circuitry 48 generates a system clock signal which is supplied to microprocessor 30 and various other elements of SCP 16B as required. Power up/down reset circuitry 52 initializes or resets microprocessor 30 when power is first applied to SCP 16B. When power up/down reset circuitry 52 detects a loss of power, a non-maskeable interrupt signal representative of this occurence is generated and supplied to microprocessor 30.

Also associated with microprocessor 30 is random access memory (RAM) 54 and electrically erasable programmable read only memory (EEPROM) 56. RAM 54 and EEPROM 56 are connected to receive address data over address bus 32, and control signals over control bus 36. Data can be read from and written to RAM 54 over bidirectional data bus 34. Data is read from EEPROM 56 over data bus 34. In one embodiment, EEPROM 56 is an Intel 2815 device. EEPROM 56 is used to store sensitive data, such as code words and encryption tables utilized by SCP 16B. This data can then be erased, as described in subsequent portions of this specification, to prevent unauthorized persons from gaining access thereto.

Physical tampering to SCP 16B, such as attempts to disassemble the unit, are detected by tamper detection hardware 60. Tamper detection hardware 60 preferably detects tampering at various locations throughout SCP 16B, and provides information representative thereof to tamper logic 62 over bus 64. Tamper logic 62 monitors tamper detection hardware 60, and produces tamper signals on tamper line 63 whenever tampering is detected. Tamper detection hardware 60 and tamper logic 62 are described in greater detail in subsequent portions of this specification.

Read/write erase control logic 58 is connected to receive tamper signals from tamper logic 62 and control signals from microprocessor 30. Read/write erase control 58 selectively provides supply potentials to EEPROM 56 over bus 73 in response to control signals received from tamper logic 62 and microprocessor 30. Read/write erase control 58 also provides control signals to EEPROM 56 over bus 73. In response to erase control signals received from microprocessor 30, or tamper signals from tamper logic 62, read/write erase control 58 will provide appropriate command signals and supply potentials over bus 73 to erase sensitive data stored within EEPROM 56.

SCP 16B also includes a timer/rate generator 66. As shown, timer/rate generator 66 is interfaced to microprocessor 30 over control bus 36 and data bus 34. Timer/rate generator 66 is used as a baud rate generator, and as an interval timer for timing window periods utilized by SCP 16B for security level purposes yet to be described. Timer/rate generator 66 also begins timing a power down period whenever the 120 v AC source is disconnected from power supply 40. If the 120 v AC source is not reconnected by the termination of the power down period, microprocessor 30 will cause all sensitive data stored within EEPROM 56 to be erased by read/write erase control 58.

SCP 16B is very flexible and can be interfaced to other security control processors such as 16A, central computer 14, or remote terminals 12A-12B, for data communications in either parallel or serial formats. SCP 16B includes programmable parallel input/output (PIO) ports 68A and 68B, and programmable serial input/output (SIO) ports 70A and 70B. PIO ports 68A, 68B, and SIO ports 70A, 70B are easily interfaced to central computer 14, remote terminals 12B-12C, and/or other SCP's 16A-16B by those skilled in the art. In one preferred embodiment, PIO ports 68A-68B and SIO ports 70A-70B are Z-80A peripheral port devices adapted for use with the Z-80A microprocessor. In the embodiment shown, SCP 16B includes built-in modems 69A-69B and 71A-71B which interface ports 68A-68B and 70A-70B, respectively, to external transmission lines.

SCP 16B can also be interfaced to other external systems through programmable parallel input/output port 72 via connector 74. Programmable parallel input/output port 72 and connector 74 can, for example, be used to interface SCP 16B to an external programming device for programming EEPROM 56. SCP 16B can also be interconnected to a module key interface or other peripheral system, such as a data logger used to monitor its status and operational characteristics, through programmable parallel input/output port 72.

IO address decoder 76 is connected to receive address information from microprocessor 30 over address bus 32, and control signals over control bus 36. Utilizing the control and address signals, IO address decoder 76 produces port select signals to select particular input/output ports and associated devices. The port select signals can be used to enable PIO ports 68A and 68B, timer/rate generator 66, SIO ports 70A and 70B, and programmable parallel input/output ports 72.

SCP 16B also includes direct memory access (DMA) controller 49 which is interfaced to control bus 36, data bus 34, and address bus 32. DMA controller 49 relieves microprocessor 30 of many memory access functions, and increases memory access time.

Status IO port circuitry 78 interfaces data bus 34 to status LEDs 80. Status port circuitry 78 monitors the status of individual lines (not shown) of data bus 34, and produces signals which drive status LEDs 80 so as to provide a visual indication thereof. Operation of SCP 16B can therefore be monitored through LEDs 80.

The embodiment of SCP 16B shown in FIG. 2 also includes Data Encryption Standard (DES) logic 82 which is interfaced to control bus 36 and data bus 34. DES logic 82 enciphers data transmitted to and deciphers data received from central computer 14 through master SCP 16A. This encryption is performed in accordance with the well known Data Encryption Standard algorithm adopted by the National Bureau of Standards in 1977. The Data Encryption Standard implements a known algorithm which uses a 56-bit key to map one 64-bit data word into another. In one embodiment, DES logic 82 is an F9414 chip set manufactured by Fairchild.

Figures 9, 10:
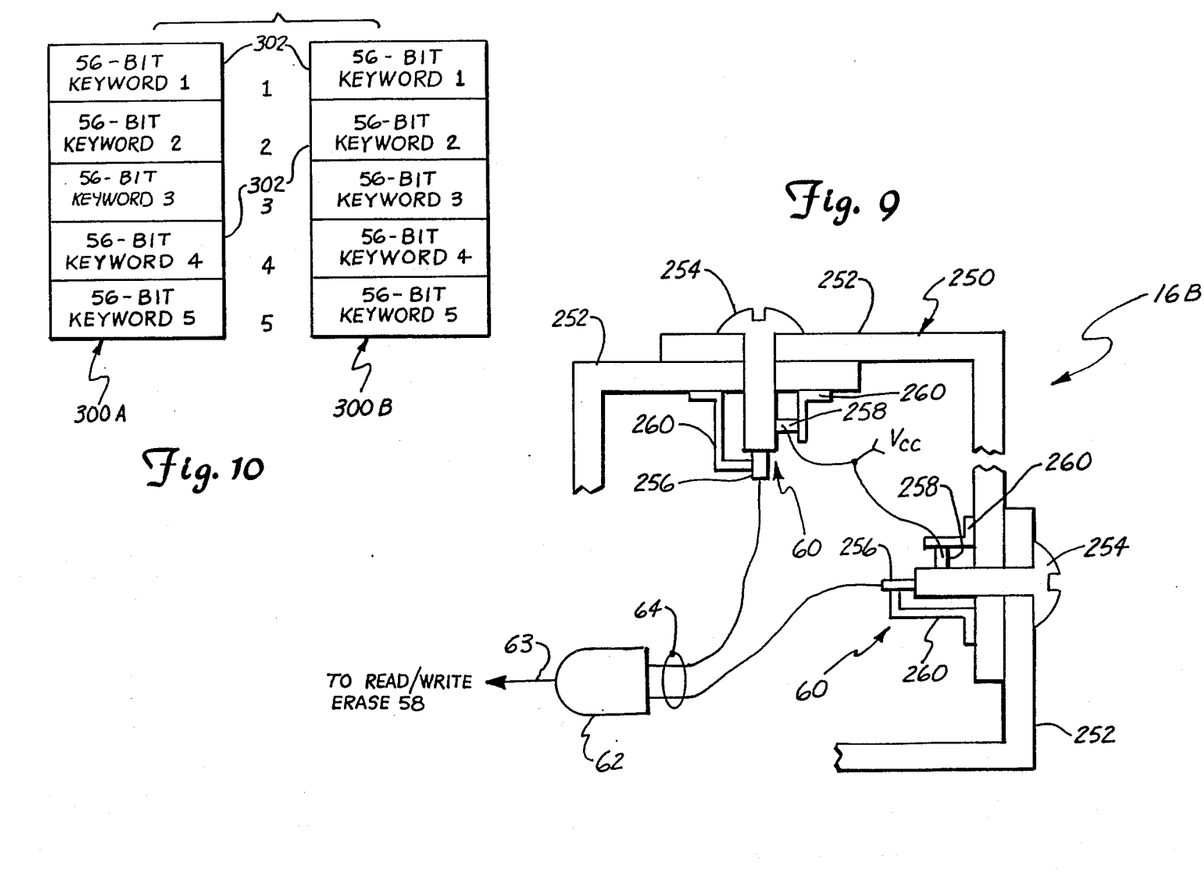
FIG. 9 is a detailed representation of the tamper detection hardware and tamper logic illustrated in FIG. 2.
FIG. 10 is a graphic representation of keyword keys utilized by master and slave security control processors to encode and decode data transmitted therebetween in accordance with a second encryption method when using the Data Encryption Standard.

One embodiment of tamper detection hardware 60 and tamper logic 62 is illustrated in FIG. 9. Tamper detection hardware 60, tamper logic 62, and other circuit elements (not shown) of SCP 16B are mounted within an enclosure 250 formed by several sections 252 which are fastened together by electrically conductive metal screws 254. Tamper detection hardware 60 detects attempts to disassemble enclosure 250 through the removal of individual screws 254. For each screw 254, tamper detection hardware 60 includes contact elements 256 and 258 which are supported for electrical contact with screws 254 by brackets 260.

Tamper logic 62 is formed by an AND gate which has input terminals interconnected to contacts 256 of each set of tamper detection hardware 60 by individual lines of bus 64. Contact elements 258 of tamper detection hardware 60 are connected to receive a Vcc supply potential such as that provided by power supply 40 or battery pack 44. Whenever one of screws 254 is removed from enclosure 250, the AND gate forming tamper logic 62 will provide a signal indicative of tampering to read/write erase logic 62 over line 63. Read/write erase logic 62, in response, will produce voltage potentials and control signals which cause sensitive data within EEPROM 56 to be erased.

III. Security Level Modes

Master SCP 16A and slave SCPs 16B and 16C are programmed to implement and operate in a plurality of security levels to prevent unauthorized access to central computer 14 from remote terminals 12B and 12C. Access to central computer 14 from remote terminals 12B or 12C is permitted only when proper security level clearances are granted and maintained. In the event that the requisite security level clearances are not granted or maintained, one of several different unauthorized access modes can be entered by master SCP 16A or slave SCPs 16B and 16C. Any combination of the below described security levels can be implemented before data communications between central computer 14 and remote terminals 12B and 12C are established. These security levels can also be implemented as desired after data communications have been established to ensure that security is maintained.

A first or slave unit security level is implemented by master SCP 16A to determine whether a particular slave SCP 16B or 16C is authorized to communicate with master SCP 16A. Slave SCPs 16B and 16C of computer security system 10 are assigned a unique slave identification code. The slave identification code is preferably stored within EEPROM 56 of slave SCPs 16B and 16C. These codes can be programmed during manufacture, or through programmable parallel input/output ports 72.

Master SCP 16A of security system 10 contains a data base of all slave identification codes associated with slave SCPs 16B and 16C which are authorized to communicate with master SCP 16A. This data base can be updated as the authorization status of slave SCPs 16B-16C changes due to theft or other circumstances. In preferred embodiments, the data base of slave identification codes are stored within EEPROM 56 of master SCP 16A, although they can also be stored within RAM 54. The slave identification codes can be used by master SCP 16A to identify not only those slave SCPs 16B-16C with which it is authorized to communicate, but also the degree of access to which they are permitted to central computer 14.

Figure 3:
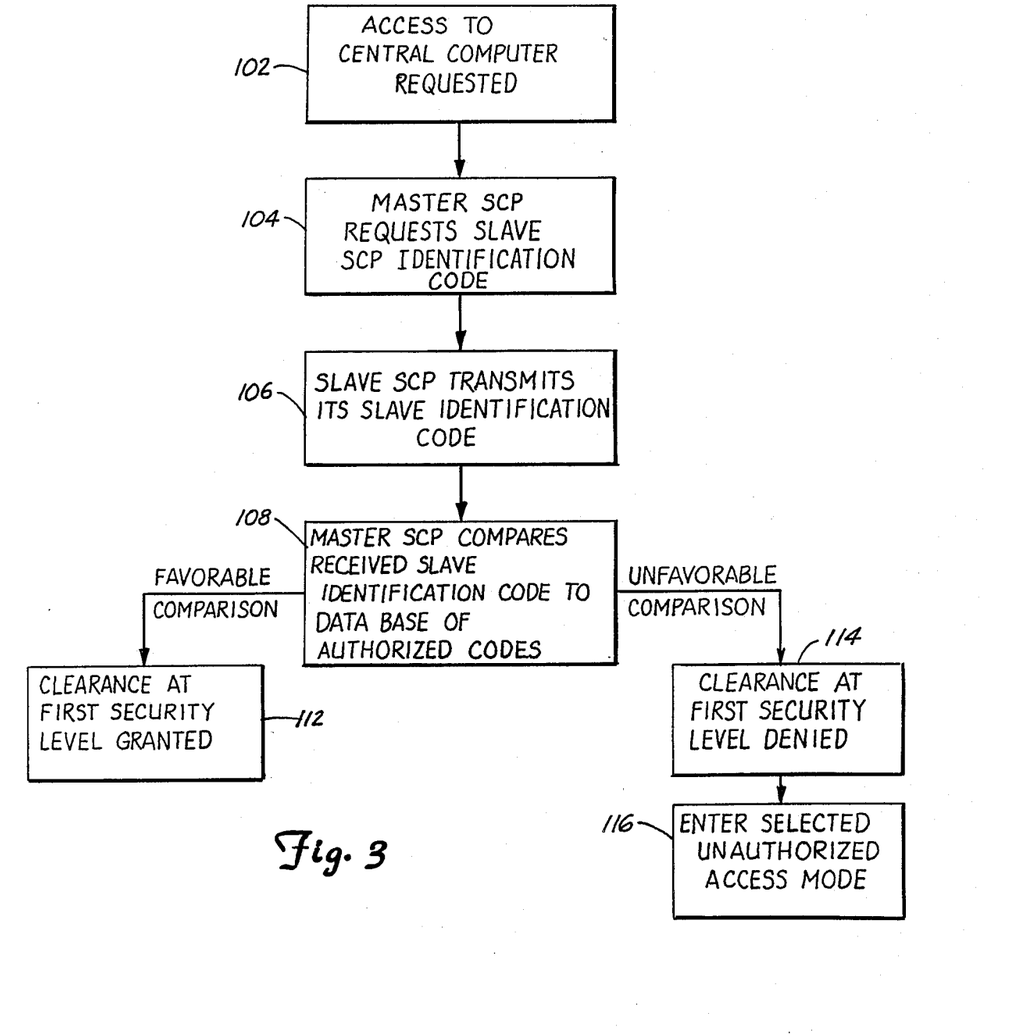
FIG. 3 is a diagram illustrating a first security level implemented by the computer security system.

The first or slave unit security level is described with reference to FIG. 3. When a remote terminal such as 12B requests access to central computer 14 (step 102), master SCP 16A will communicate with slave SCP 16B and request its slave identification code (step 104). In response to this request, slave SCP 16B will transmit its slave identification code to master SCP 16A as indicated by step 106. Master SCP 16A then compares the received slave identification code to the data base of authorized identification codes stored therein (step 108). Upon a favorable comparison, clearance at the first security level is granted as indicated at 112. Master SCP 16A and slave SCP 16B then continue operation in a normal manner.

If the comparison mode at step 108 is unfavorable, i.e., when the slave identification code received from slave SCP 16B is not authorized, master SCP 16A will deny clearance at the slave unit security level as indicated at step 114. Clearance at the first security level may be denied, for example, when slave SCP 16B is stolen and the data base of authorized slave identification codes within master SCP 16A is updated to reflect this fact. When clearance at the first security level or others yet to be described is denied by master SCP 16, one of several unauthorized access modes will be selected and entered as indicated at step 116. These unauthorized access modes are best described with reference to FIG. 4.

Figure 4:
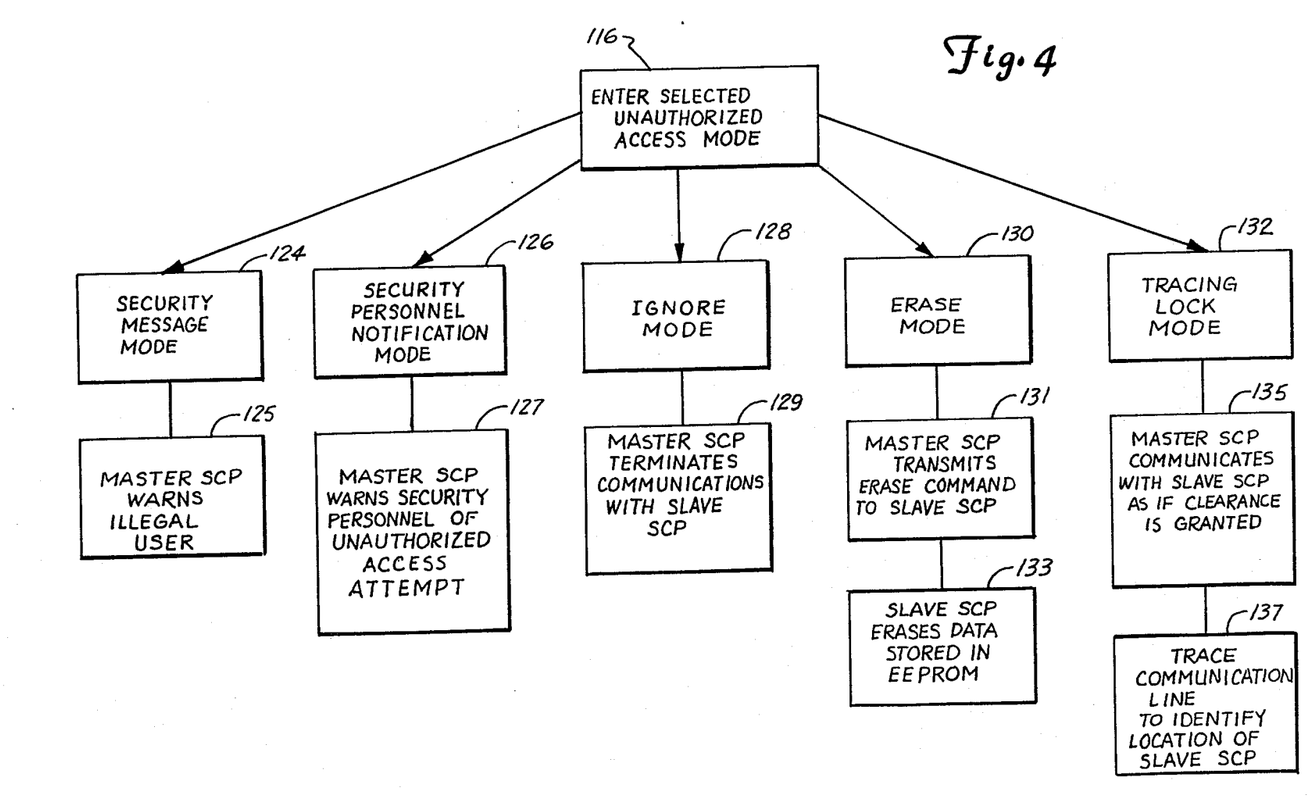
FIG. 4 is a diagram illustrating unauthorized access modes implemented by the computer security system.

As shown at 116 in FIG. 4, master SCP 16A will select and enter one of a plurality of unauthorized access modes after clearance is denied at a security level. The particular unauthorized access mode selected will typically depend upon a variety of factors including the degree of security deemed necessary to adequately protect data within central computer 14, and the sensitivity of the data. In the embodiment shown, master SCP 16 can select from unauthorized access modes including security message mode 124, security personnel notification mode 126, ignore mode 128, erase mode 130, and tracking lock mode 132. Unauthorized access modes 124, 126, 128, 130 and 132 can also be used in any desired combination.

When security message mode 124 is entered, master SCP 16A transmits data representative of a security message to remote terminal 12B through slave SCP 16B as indicated at 125. The message can identify computer security system 10, indicate that any received code such as the slave identification code is unauthorized, and/or warn the operator of remote terminal 12B to discontinue future attempts at communicating with central computer 14.

When security personnel notification mode 126 is selected, master SCP 16A provides an indication to personnel in charge of security of central computer 14 that an unauthorized remote terminal such as 12B has attempted to gain access, as indicated at 127. This notification can, for example, be made via an external audio or visual alarm through programmable parallel input/output ports 72.

When ignore mode 128 is entered, master SCP 16A simply terminates communications with the slave SCP 16B as indicated at 129.

When erase mode 130 is entered, master SCP 16A will produce an erase command signal which is transmitted to slave SCP 16B as indicated at 131. In response to the erase command signal, microprocessor 30 of slave SCP 16B (FIG. 1) will produce an erase control signal causing read/write erase 58 to erase all data stored within EEPROM 56 as indicated at 133. Slave SCP 16B will then be incapable of any further data communications with master SCP 16A, thereby prohibiting access to central computer 14 by remote terminal 12B.

When tracing lock mode 132 is entered, master SCP 16A will continue to communicate with slave SCP 16B as if clearance at the requested security level has been granted as indicated at 135. Master SCP 16B can, for example, transmit nonconfidential or erroneous data in such a manner that remote terminal 12B and slave SCP 16B believe clearance at the requested security level has been granted. Master SCP 16A will also provide an indication to an operator that an unauthorized user (i.e. remote terminal 12B and/or slave SCP 16B) is attempting access to central computer 14 as shown at 137. Appropriate actions can then be made to trace the communication line so as to identify the location or source of the unauthorized slave SCP 16B or remote terminal 12B.

Figure 5:
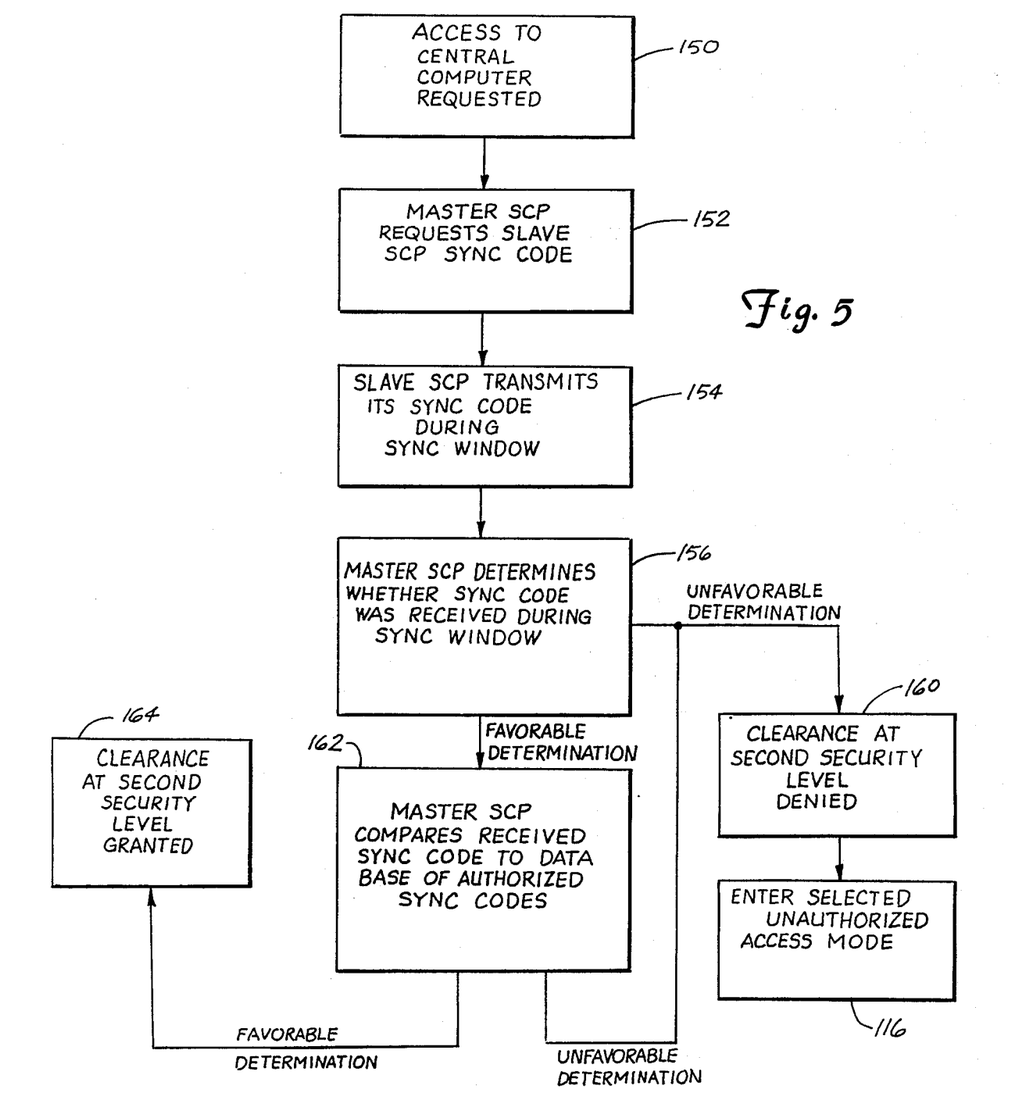
FIG. 5 is a diagram illustrating a second security level implemented by the computer security system.

A second or sync security level implemented by computer security system 10 is best described with reference to FIG. 5. Slave SCPs 16B–16C of security system 10 each include a unique slave unit sync code which is preferably stored within EEPROM 56 (FIG. 1). A data base of slave unit sync codes of all slave SCPs 16B–16C which are authorized to communicate with master SCP 16A are stored within memory, preferably EEPROM 56, of master SCP 16A.

When access to central computer 14 is requested by a remote terminal such as 12B (step 150), master SCP 16A will request the sync code from slave SCP 16B through which access is being requested, as indicated at step 152. Slave SCP 16B will then transmit its sync code to master SCP 16A during, or within, a predetermined sync window time period as indicated at step 154. Data representative of the precise sync window can be stored within slave SCP 16B, or can be transmitted by master SCP 16A. Each slave SCP 16B–16C of computer security system 10 can also use a different sync window.

After receiving the sync code, master SCP 16A will determine whether or not the code was received during the sync window as indicated by step 156. If the determination is unfavorable and the code was not received during the sync window, clearance at the second security level is denied as indicated at step 160, and one of the unauthorized access modes discussed above is selected and entered by master SCP 16A as indicated at 116. If a favorable determination is made, master SCP 16A will compare the received sync code to the data base of authorized sync codes stored within EEPROM 56 at step 162. If this comparison is favorable, clearance at the second security level is granted as indicated at 164. Alternatively, if the comparison is unfavorable at step 162, clearance at the second security level will be denied and an unauthorized access mode will be selected and entered by master SCP 16A (steps 160 and 162).

The second security level described above can be flexibly implemented. In addition to requesting the slave unit sync code before establishing communications, master SCP 16A can periodically request the slave unit sync code from slave SCPs 16B–16C after data communications have been established. Communications can then be terminated if an unauthorized sync code is received, or if the code is not received during the proper sync window.

Figure 6:
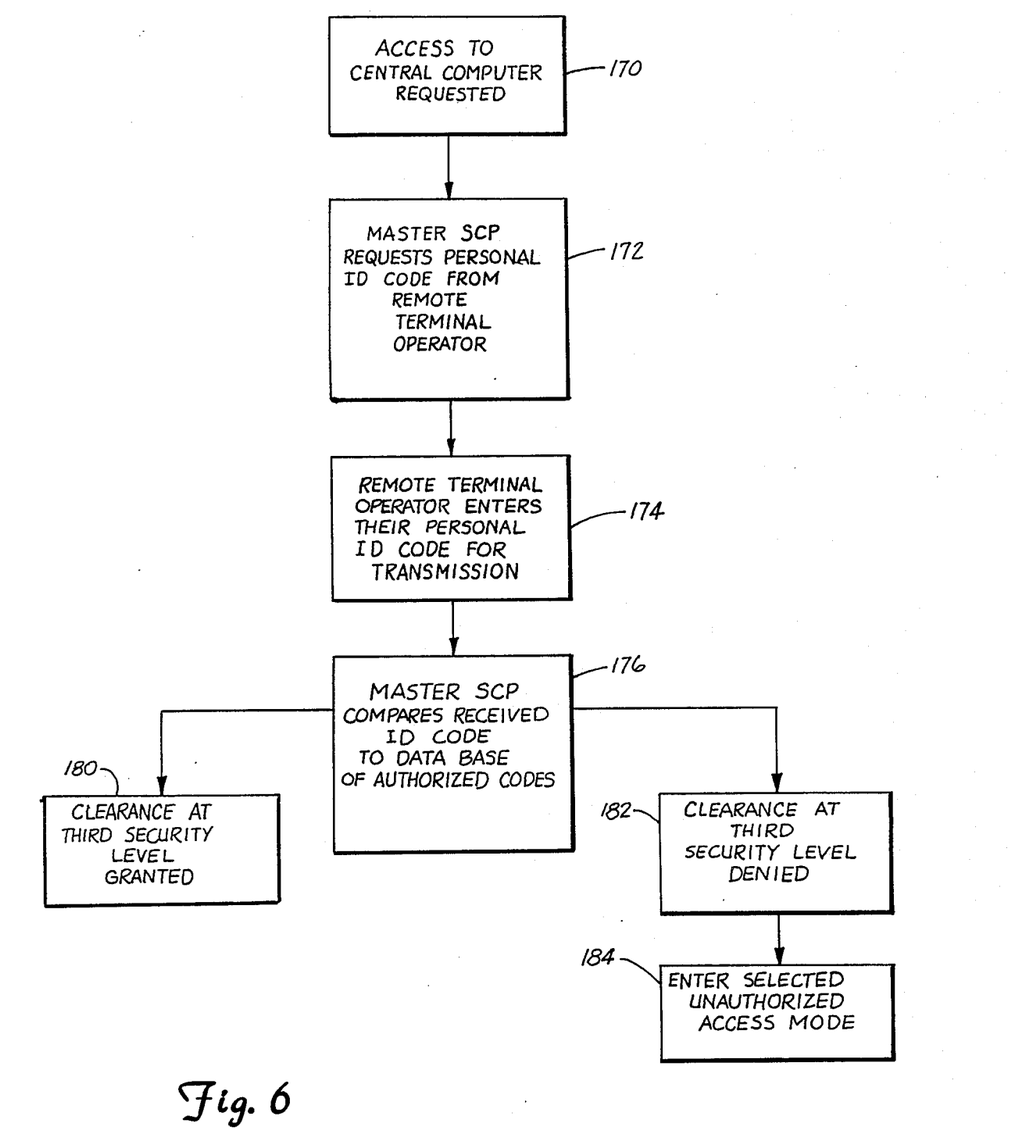
FIG. 6 is a diagram illustrating a third security level implemented by the computer security system.

A third or operator security level implemented by security system 10 is described with reference to FIG. 6. All persons having access to central computer 14 will be assigned a unique personal ID code. A data base of personal ID codes of all persons authorized to use central computer 14 will be stored within memory, preferably EEPROM 56, of master SCP 16A. When access to central computer 14 is requested (step 170), master SCP 16A will request the personal ID code from the operator of the remote terminal such as 12B (step 172). The operator will then enter their personal ID code into remote terminal 12B, from where it will be transmitted to master SCP 16A through slave SCP 16B (Step 174). After receiving the personal ID code, master SCP 16A will compare the code to the data base of authorized ID codes stored therein (step 176). Upon a favorable comparison at step 176, clearance at the third security level is granted as indicated at 180. Upon an unfavorable comparison, clearance at the third security level is denied (step 182), and an unauthorized access mode will be selected and entered by master SCP 16A as indicated at 184.

In one preferred embodiment, the first, second, and third security levels described above are all implemented by computer security system 10. Master SCP 16A will permit data communications between computer 14 and remote terminals 12B or 12C only after clearance at all three security levels has been granted. Once data communications have been established, master SCP 16A will periodically implement the second or sync security level to ensure that security is being maintained.

IV. Data Encryption

All data which is communicated between master SCP 16A and slave SCPs 16B–16C over transmission lines 22–23 is encrypted, or enciphered, to ensure its security in the event it is intercepted. If data is being transmitted to central computer 14 from remote terminal 12B, slave SCP 16B will encipher data received from remote terminal 12B, and master SCP 16A will decipher this data before passing it on to central computer 14. In a similar manner, data being transmitted from central computer 14 to remote terminal 12B will first be enciphered by master SCP 16A, and then deciphered by slave SCP 16B before being passed on to remote terminal 12B. For purposes of example, the following explanation will assume data is being transmitted from central computer 14 to remote terminal 12B. It will be understood that a similar procedure can be implemented when data transmission is in the opposite direction.

Figure 7:
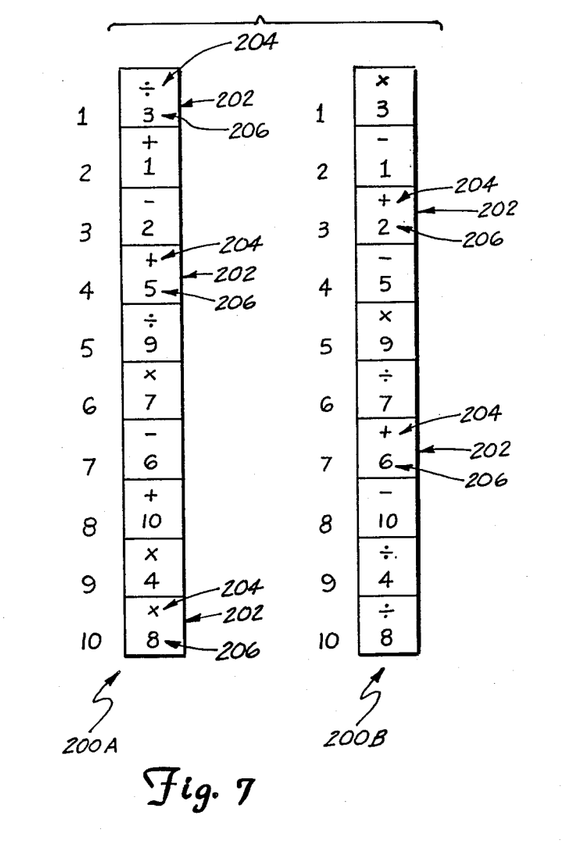
FIG. 7 is a graphic representation of cipher keys utilized by the master and slave security control processors of the present invention to encode and decode data transmitted therebetween in accordance with one encryption method.

One enciphering technique implemented by computer security system 10 is best described with reference to FIG. 7. Master SCP 16A will include a master cipher key 200A. Slave SCP 16B (which is representative of slave SCPs 16B–16C) includes a slave cipher key 200B. As shown in FIG. 7, cipher keys 200A and 200B are identical in size and formed by a plurality of indexed cipher locations 202. Cipher keys 200A and 200B both have ten (i.e., numbers one through ten) indexed cipher locations 202 in the embodiment shown in FIG. 7, although any other number can be used. Cipher keys 200A and 200B are preferably stored with EEPROM 56 of SCPs 16A and 16B, respectively, so that they can be erased when erase mode 130 (FIG. 4) is selected as an unauthorized access mode as previously described.

Each indexed cipher location 202 includes data representative of a mathematical function. In the embodiment shown in FIG. 7, each mathematical function is formed by a mathematical operator 204, and a number 206. Mathematical operators 204 in the embodiment shown include arithmetic addition, subtraction, multiplication, and division operators. Corresponding indexed cipher locations 202 from cipher keys 200A and 200B have complementary mathematical functions in that if a given number is operated on by functions from corresponding cipher locations 204 of both cipher keys 200A and 200B, the result will be the given number started with. These complementary mathematical functions are implemented in cipher keys 200A and 200B by having complementary mathematical operators 204 (e.g., division and multiplication, or addition and subtraction), and identical numbers 206 in corresponding cipher locations 202.

To encipher data before transmission from central computer 14 to remote terminal 12B, master SCP 16 will operate on blocks or groups of data of predetermined size, such as individual characters, by the mathematical function from one of indexed cipher locations 202 of cipher key 200A. When operating on characters by the first indexed cipher location 202, for example, master SCP 16A will divide all data representative of individual characters by three before transmission to slave SCP 16B. Slave SCP 16B will then decipher the encoded data by operating on this data by the mathematical function of the first indexed cipher location 202 of cipher key 200B. In other words, slave SCP 16B multiplies the received data by three before passing it on to remote terminal 12B.

In preferred embodiments, master SCP 16A will operate on a predetermined number of characters with the mathematical function of a selected indexed cipher location 202. Master SCP 16A will then select another indexed cipher location 202 and operate on another group of characters by the mathematical function of this next selected indexed cipher location 202. In one preferred embodiment, both the number of characters to be operated on by the mathematical function of each selected cipher location 202, and the next cipher location 202, are determined as a function of a check sum of uncoded data operated on by an immediately preceding cipher location 202, as illustrated in FIG. 8.

Figure 8:
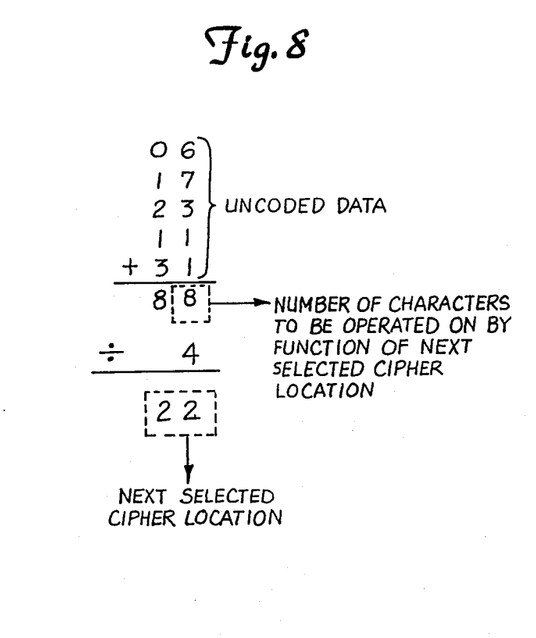
FIG. 8 is a graphic illustration of the mathematical technique by which the master and slave security control processors determine a next selected cipher location and the number of characters to be operated on by a next selected cipher location.

In the example used in FIG. 8, a block of five alphanumeric characters represented by decimal numbers six, seventeen, twenty-three, eleven, and thirty-one, respectively, are to be enciphered by master SCP 16A and transmitted to slave SCP SCP 16B in accordance with the above described enciphering technique. As shown, the check sum of these uncoded numbers is eighty-eight. The last digit of this check sum, i.e., the number eight, is utilized by both master SCP 16A and slave SCP 16B to represent the number of characters to be operated on by the mathematical function of the next selected cipher location 202. This check sum can then be divided by a predetermined number (e.g., four) to produce a number representative of the next selected cipher location 202. In the example used in FIG. 8, both master SCP 16A and slave SCP 16B will operate on the next eight characters communicated therebetween by the mathematical function of the twenty-second indexed cipher location 202 (not shown in FIG. 7).

In another embodiment of SCP 16B, all data enciphering and deciphering is performed by DES logic 82 shown in FIG. 2. DES logic 82 makes use of a fifty-six bit keyword to perform these encryption functions. In this embodiment, master SCP 16A will include a master keyword key 300A while slave SCP 16B includes a slave keyword key 300B, as shown in FIG. 10. Keyword Keys 300A and 300B are preferably stored in EEPROM 56, and each include a plurality (five are shown in FIG. 10) of indexed keyword locations 302. Each keyword location 302 includes a unique keyword.

Keywords of corresponding indexed keywords 302 of keys 300A and 300B are identical. The number of characters to be enciphered or deciphered using a particular keyword 302, and next selected keywords 302, can be determined as a function of a check sum of uncoded data, as previously described. Keywords from keys 300A and 300B, and the number of characters to be encoded using the keyword of a paticular keyword location, are therefore randomly selected. Through the use of DES logic 82 to encipher and decipher data in this manner, high data transfer rates can be achieved.

V. Conclusion

As described above, the present invention is a computer security system for interfacing a central computer with one or more peripheral devices such as remote terminals. The security system includes a master security control processor which is associated with the central computer, and one or more slave security control processors, each of which is associated with one of the remote terminals. Clearance at several security levels is required before communications between one of the remote terminals and the central computer is authorized. These security levels can also be implemented after communications are established to ensure only authorized access to the central computer. One of several unauthorized access modes are implemented when access to the central computer is requested by an unauthorized remote terminal or unauthorized slave security control processor.

All data communicated between the master and slave security control processors is encrypted for security. All data utilized by the encryption technique of the present invention, as well as data used to implement the security levels, is stored in erasable memory. This data can then be destroyed when a security control processor is used in an unauthorized manner, or when physical tampering thereto is detected. Although one preferred circuit implementation for the security control processors is described, the functions attributed thereto can be easily implemented by other designs. Those skilled in the art can easily program these devices to implement the functions described above.

Although the present invention has been described with reference to preferred embodiments, workers skilled in the art will recognize that changes may be made in form and detail without departing from the spirit and scope of the invention.

What is claimed is:

1. A multi-level computer security system of the type having a master access control unit having a master unit database memory for storing codes characteristic of authorized slave access control units and adapted to selectively interface a central computer to a data transmission path and at least one slave access control unit adapted to interface a peripheral unit to the data transmission path, for controlling communications between the peripheral unit and the central computer over the data transmission path and preventing unauthorized access to the central computer; wherein the system is characterized by a first security level procedure at which the slave access control unit transmits a slave unit identification code over the data transmission path to the master access control unit which, when received, is compared by the master access control unit to slave unit identification codes of authorized slave access control units stored in the master unit database memory, and a first security level clearance granted by the master access control unit upon a favorable comparison, and a second security level procedure at which the master access control unit requests from the slave access control unit over the data transmission path a slave unit sync code which must be received over the data transmission path by the master access control unit during a predetermined sync window and which, when received, is compared by the master access control unit to sync codes of authorized slave units stored in the master unit database memory, and a second security level clearance grated upon a favorable comparison of the received sync code and the sync codes stored in memory if the sync code was received during the sync window, the security system permitting data transmission between the peripheral unit and the central computer through the master and slave access control units and over the data transmission path only if the first and second security clearances are granted, and wherein the master access control unit periodically requests the slave unit sync code from the slave access control unit during data transmission after the first and second security clearance are granted, and terminates data transmission between the peripheral unit and the central computer unless a valid sync code is received during the sync window.

2. The computer security system of claim 1 wherein the master access control unit requests the slave unit identification code from the slave access control unit at the first security level, and the slave access control unit transmits the slave unit identification code in response to the request.

3. The computer security system of claim 1 wherein each slave access control unit of the system is assigned a unique slave unit identification code, and includes memory means for storing the slave access control unit identification code.

4. The computer security system of claim 1 wherein each slave, unit of the system is assigned a unique slave unit sync code, and includes memory means for storing the sync code.

5. The computer security system of claim 1 and further characterized by a third security level at which the master access control unit requests a personal identification code from an operator of the peripheral unit, which when received by the master access control unit is compared to authorized personal identification codes stored in the master unit database memory, and a third security level clearance granted upon a favorable comparison, the security system permitting data transmission between the peripheral unit and the central computer only if the first, second, and third security clearances are granted.

6. The computer security system of claim 1 and further characterized by an unauthorized access mode in which the master access control unit maintains the data transmission path between the slave access control unit and master access control unit and causes nonsensitive data to be transmitted to the slave access control unit, thereby permitting a trace to be made on the data transmission path so as to identify the source of the slave access control unit to which security level clearance was denied.

7. A computer security system of the type having at least one slave access control unit adapted to interface a peripheral unit to a data transmission path and including memory means for storing cipher data and authorization code data, and a master access control unit adapted to selectively interface a central computer to the data transmission path and for granting security level clearances to the slave access control unit as a function of authorization codes received from the slave access control unit over the data transmission path and permitting data transmission between the peripheral unit and central computer through the master and slave access control unit over the data transmission path when security level clearance is granted by the master access control unit and prohibiting data transmission over the data transmission path when security level clearance is denied, thereby preventing unauthorized access to the central computer by the peripheral unit; wherein the system is characterized by the slave access control unit including electrically erasable programmable read only memory means for storing the cipher data and authorization code data, erase control means capable of erasing data stored in the erasable member means in response to erase commands from the master access control unit over the data transmission path, and a first unauthorized access mode in which the master access control unit generates and supplies an erase command to the slave access control unit when security level clearance is denied, thereby causing the data in the erasable memory means to be erased.

8. The computer security system of claim 7 and further characterized by a second unauthorized access mode in which the master access control unit maintains the data transmission path between the slave access control unit and master access control unit and causes nonsensitive data to be transmitted to the slave access control unit, thereby permitting a trace to be made on the data transmission path so as to identify a source of the slave access control unit to which security level clearance was denied.

9. A computer security system of the type having a master access control unit adapted to selectively interface a central computer to a data transmission path and at least one slave access control unit adapted to interface a peripheral unit to the data transmission path and including memory means for storing authorization code data and cipher data, for controlling communications between the peripheral unit and the central computer over the data transmission path and preventing unauthorized access to the central computer; wherein the system is characterized by the slave access control unit including erasable memory means for storing the authorization code data and cipher data, AC power supply means for receiving electric power from an AC line source and providing power to the slave access control unit, battery backup power supply means for providing power to the slave access control unit when power from the AC line source is interrupted, and erase control means for tracking power available from the backup power supply means and for causing data in the erasable memory means to be erased before power from the battery backup power supply means is consumed.

10. The computer security system of claim 9 wherein the erasable memory means of the slave access control unit is an electrically erasable programmable read-only-memory (EEPROM).

11. The computer security system of claim 9 wherein the erase control means causes data stored in the erasable memory means to be erased after power from the AC line source is interrupted for a predetermined period.

12. A computer security system of the type having a master access control unit adapted to selectively interface a central computer to a data transmission path and including memory means for storing authorization code data and cipher data, and at least one slave access control unit adapted to interface a peripheral unit to the data transmission path, for controlling communications between the peripheral unit and the central computer over the data transmission path and preventing unauthorized access to the central computer; wherein the system is characterized by the master access control unit including erasable memory means for storing the authorization code data and cipher data, AC power supply means for receiving electric power from an AC line source and providing power to the master access control unit, battery backup power supply means for providing power to the master access control unit when power from the AC line source is interrupted, and erase control means for tracking power available from the backup power supply means and for causing data in the erasable memory means to be erased before power from the battery backup power supply means is consumed.

13. The computer security system of claim 12 wherein the erasable memory means of the master access control unit is electrically erasable programmable read-only-memory (EEPROM).

14. The computer security system of claim 12 wherein the erase control means causes data stored in the erasable memory means to be erased after power from the AC line source is interrupted for a predetermined period.

15. A computer security system of the type having a master access control unit which is adapted to selectively interface a central computer to a data transmission path and at least one slave access control unit which is adapted to interface a peripheral unit to the data transmission path, for controlling communications between the peripheral unit and central computer over the data transmission path and preventing unauthorized access to the central computer, both the master and slave access control units including cipher means for securing data transmission between the central computer and peripheral unit; which cipher means of the master and slave access control units is characterized by memory means for storing data representative of a cipher key formed by a plurality of indexed cipher locations, each location including data representative of a mathematical operator and a number and wherein corresponding indexed cipher locations of the master access control unit and slave access control unit have complementary mathematical operators and identical numbers, means for randomly selectively one of the indexed locations, and computing means for mathematically operating on data by the mathematic operator and number of the selected corresponding indexed cipher locations so as to encipher data to be transmitted over the transmission path and to decipher data received over the data transmission path.

16. The computer security system of claim 15, wherein the means for storing the cipher key in one of the master and slave access control units includes data representative of an addition operator in at least some of the cipher locations, and the means for storing the cipher key in the other of the master and slave access control units includes data representative of a subtraction operation in corresponding cipher locations.

17. The computer security system of claim 15 wherein the means for storing the cipher key in one of the master and slave access control units includes data representative of a multiplication operator in at least some of the cipher locations, and the means for storing the cipher key in the other of the master and slave access control units includes data representative of a division operation in corresponding cipher locations.

18. The computer security system of claim 15 wherein the means for mathematically operating operates on data blocks of a predetermined size.

19. The computer security system of claim 18 wherein the means for mathematically operating operates on data blocks representative of individual characters.

20. The computer security system of claim 18 wherein the means for mathematically operating operates on a predetermined number of data blocks by the function of the selected indexed cipher locations.

21. The computer security system of claim 18 wherein the means for mathematically operating determines the predetermined number of data blocks to be operated on by the function of a next selected cipher location as a function of data operated on by the function of a preceding cipher location.

22. The computer security system of claim 21 wherein the means for mathematically operating determines the predetermined number of data blocks to be operated on by the function of the next selected cipher location as a function of a check sum of data operated on by the function of an immediately preceding cipher location.

23. The computer security system of claim 15 wherein the means for mathematically operating causes a next selected cipher location to be selected as a function of data operated on by the function of a preceiding cipher location.

24. The computer security system of claim 23 wherein the means for mathematically operating causes the next selected cipher location to be selected as a predetermined function of a check sum of data operated on by the function of the preceding cipher location.

25. A computer security system of the type having a master access control unit which is adapted to selectively interface a central computer to a data transmission path and at least one slave access control unit which is adapted to interface a peripheral unit to the data transmission path, for controlling communications between the peripheral unit and central computer over the data transmission path and preventing unauthorized access to the central computer, both the master and slave access control units including cipher means for securing data transmission between the central computer and peripheral unit in accordance with an encryption algorithm which operates on multiple bit data words by using a multiple bit keyword to map each multiple bit data word into another data word; wherein the cipher means of the master and slave access control units are characterized by means for storing data representative of a keyword key formed by a plurality of indexed keyword locations, each of which includes a keyword and wherein corresponding indexed keyword locations of the master and slave access control units have identical keyboards, and means for randomly selecting identical indexed keyword locations from the keyword keys, the keywords of which are used by the cipher means of the master and slave access control units to encipher data to be transmitted over the data transmission path, and to decipher data received over the data transmission path.

26. The computer security system of claim 25 herein the indexed keyword locations of the master and slave access control units include unique keywords.

27. The computer security system of claim 25 wherein the cipher means secures data transmissions in accordance with the Data Encryption Standard encryption algorithm.

28. The computer security system of claim 25 wherein the cipher means operates on a predetermined number of data words with each selected keyword.

29. The computer security system of claim 28 wherein the cipher means determines the predetermined number of data words to be operated on by a keyword of a next selected keyword location as a function of data operated on by the keyword of a preceding keyword location.

30. The computer security system of claim 29 wherein the cipher means determines the predetermined number of data words to be operated on by the keyboard of the next selected keyword location as a function of a check sum of data operated on by the keyword of an immediately preceding keyword location.

31. The computer security system of claim 25 wherein the cipher means causes a next selected keyword location to be selected as a function of data operated on by the keyword of a preceding keyword location.

32. The computer security system of claim 31 wherein the cipher means causes the next selected keyword location to be selected as a predetermined function of a check sum of data words operated on by the keyword of the preceding keyword location.

* * * * *

UNITED STATES PATENT AND TRADEMARK OFFICE
CERTIFICATE OF CORRECTION

PATENT NO. : 4,882,752
DATED : November 21, 1989
INVENTOR(S) : Richard S. Lindman et al.

It is certified that error appears in the above-identified patent and that said Letters Patent is hereby corrected as shown below:

Column 14, line 22, delete "clearance" and insert --clearances--.

Column 14, line 38, after "slave", delete "," and insert --access control--.

Column 17, line 31, delete "preceiding" and insert --preceding--

Column 18, line 9, delete "keyboards" and insert --keywords--.

Column 18, line 16, delete "herein", and insert --wherein--.

UNITED STATES PATENT AND TRADEMARK OFFICE
CERTIFICATE OF CORRECTION

PATENT NO. : 4,882,752

DATED : November 21, 1989

INVENTOR(S) : Richard S. Lindman, et al

It is certified that error appears in the above-identified patent and that said Letters Patent is hereby corrected as shown below:

Column 18, line 35, delete "keyboard" and insert --keyword--.

Signed and Sealed this

First Day of January, 1991

Attest:

HARRY F. MANBECK, JR.

*Attesting Officer*         *Commissioner of Patents and Trademarks*